United States Patent [19]
Yasumatsuya et al.

[11] B 4,010,401
[45] Mar. 1, 1977

[54] CONSTANT-VOLTAGE CONVERTER HAVING BEAM CURRENT DETECTOR

[75] Inventors: Noboru Yasumatsuya; Mitsuo Isobe, both of Kadoma, Japan

[73] Assignee: Matsushita Electric Industrial Co., Ltd., Kadoma, Japan

[22] Filed: Dec. 6, 1973

[21] Appl. No.: 422,156

[44] Published under the second Trial Voluntary Protest Program on March 23, 1976 as document No. B 422,156.

Related U.S. Application Data

[63] Continuation-in-part of Ser. No. 205,627, Dec. 7, 1971, abandoned.

[30] Foreign Application Priority Data

Dec. 13, 1970 Japan .............................. 45-110818

[52] U.S. Cl. ......................... 315/379; 178/DIG. 11; 315/411; 323/20; 323/22 T
[51] Int. Cl.² ........................................ H01J 29/52
[58] Field of Search .......... 315/411, 379, 369, 308; 323/20, 22 V, 22 T, 22 SC; 178/DIG. 11

[56] References Cited
UNITED STATES PATENTS

2,362,358  11/1944  Daly .................................... 315/411
3,517,301  6/1970  Huber .................................. 323/20
3,619,705  11/1971  Waybright .......................... 315/379

Primary Examiner—Richard A. Farley
Assistant Examiner—Richard E. Berger

[57] ABSTRACT

A constant voltage converter for use with a cathode ray tube in which a voltage regulator is controlled by both the output of the regulator and beam current from the cathode ray tube by way of beam detecting means. The output of the regulator is applied separately to a stabilizing circuit including another feedback circuit for CRT, and also to deflection circuits so as to better prevent fluctuation of picture on the CRT.

8 Claims, 9 Drawing Figures

CONSTANT-VOLTAGE CONVERTER HAVING BEAM CURRENT DETECTOR

This is a continuation-in-part of application Ser. No. 205,627, filed Dec. 7, 1971, now abandoned.

The present invention relates to a constant-voltage converter and more particularly to a constant-voltage converter for use with a cathode ray tube.

In a conventional constant-voltage converter for television receivers, a voltage regulator is controlled by a feedback circuit including a comparator and a reference voltage circuit in which a part of the output from the voltage regulator is applied to an input of the comparator together with the output from the reference voltage, and the output from the comparator is, in turn, applied to the regulator. However, favorable result has not been obtainable from this feedback circuit because of an unstability of the feedback circuit where a sufficient loop gain cannot be obtained. In order to obtain more desirable function, some of the converters utilize a beam current from a beam current detecting circuit.

However, hereagain a satisfactory result is not obtainable because an output power to the power supply of CRT and other circuits such as a horizontal and vertical deflection circuits, video amplifier circuits is the same controlled D.C. power from the voltage regulator, so that an interference between circuits often takes place. On the other hand, it has been revealed that the load current of the voltage regulator is mainly dependent on the beam current of the cathode ray tube, that is, a display tube.

The specific purpose of this invention is to provide a constant-voltage converter having beam current detecting means for producing a beam current signal representing the intensity of the beam current of the cathode ray tube for supplying a D.C. power to a cathode ray tube, which has an improved voltage regulation characteristics.

An object of the present invention is to provide a constant-voltage converter for separately supplying a controlled D.C. power both to a cathode ray tube through another stabilizing circuit, and load circuits including a horizontal deflection circuit, vertical deflection circuit, chroma circuit, and video amplifier circuits, etc., directly.

Another object of the present invention is to provide a constant-voltage converter wherein even if the controlled D.C. voltage is regulated to be adaptable to the horizontal and vertical deflection circuits, the high voltage applied to the anode of the cathode ray tube is secured constant through the second stable circuit and a stable operation is obtainable.

The specific construction of this invention will be understood when the detailed description is read in conjunction with the drawings wherein.

Figures 1, 2:
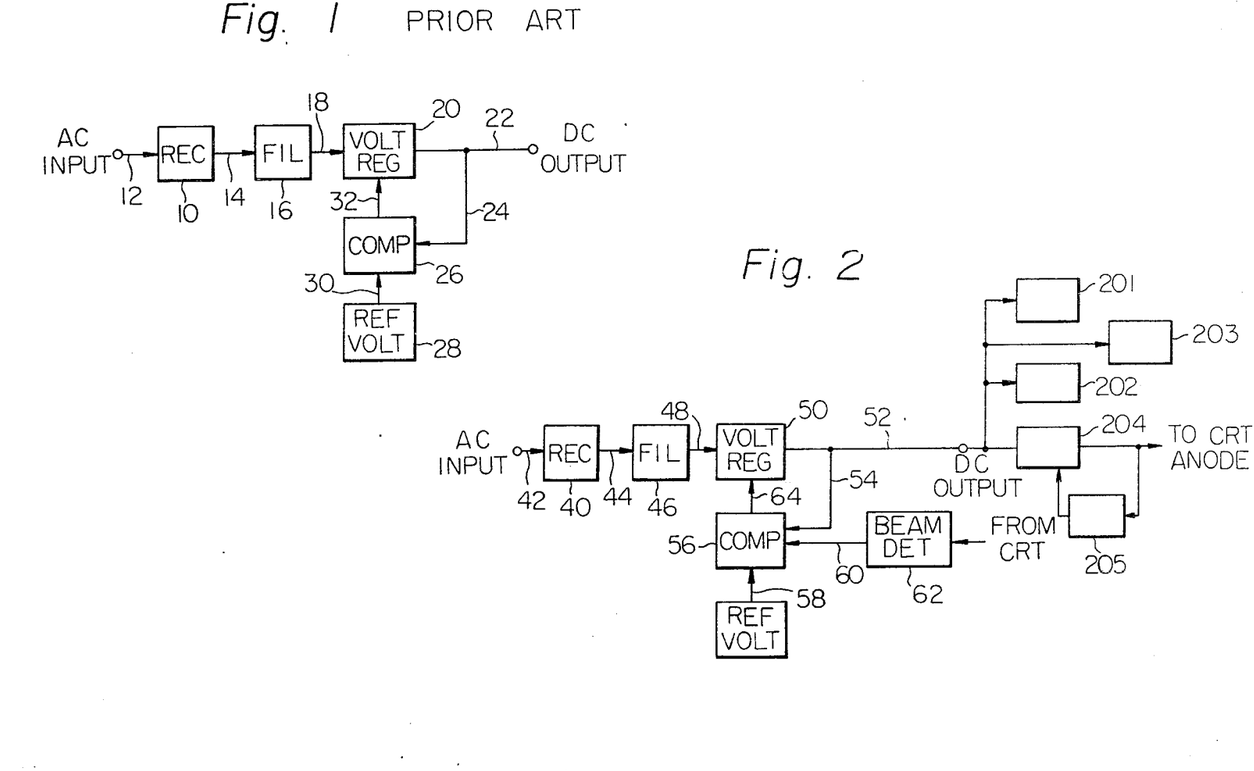
FIG. 1 is a block diagram of a conventional constant-voltage converter.
FIG. 2 is a block diagram of a converter according to this invention.

Referring now to FIg. 1, a conventional constant-voltage converter is shown, which comprises a rectifier 10 rectifying an A.C. power supplied through a line 12. The rectified power is applied through a line 14 to a smoothing filter 16 which smoothes the rectified power by removing ripple components thereof. The rectified and smoothed power is applied through a line 18 to a voltage regulator 20. The voltage regulator 20 regulates its input voltage and produces a D.C. power having a constant-voltage which is applied through a line 22 to a circuit connected to a cathode ray tube (not shown). The D.C. power is, on the other hand, applied through a line 24 to one input of a comparator 26. The comparator 26 has another input to which a reference voltage signal from a reference voltage circuit 28 is applied through a line 30. The comparator 26 then produces a control signal by comparing both signals applied to the inputs thereof, which control signal is applied through a line 32 to the voltage regulator 20. The voltage regulator then regulates its output voltage in accordance with the control signal.

However, the above-mentioned converter is not fully acceptable because of its insufficient voltage regulation characteristics resulting from that the loop gain of the feedback circuit constituted by the comparator 26 should be limited to prevent undesired oscillation.

FIG. 2 shows an improved converter according to the present invention, which solves problems encountered in the circuits according to prior arts. The converter comprises voltage regulator 50, comparator 56, beam detection circuit 62, horizontal deflection circuit 201, vertical deflection circuit 202, load circuits 203 including video intermediate frequency amplifiers, a chroma circuit, a video amplifier circuit, and a tuning circuit, and a stabilizing circuit (the structure is already known) for stabilizing the output power to the anode of CRT.

The invention also comprises a rectifier 40 which which rectifies an A.C. power supplied through a line 42. The rectified power is then applied through a line 44 to a smoothing filter 46. The smoothing filter smoothes the rectified power by removing ripple components thereof. The smoothed power is applied through a line 48 to an input of a voltage regulator 50 which regulates the input power in accordance with a control signal to be applied through another input of the regulator so as to produce a D.C. power having a constant-voltage on the output thereof. The output of the regulator 50 is applied to the horizontal and vertical circuits 201 and 202, the load circuit 203 including video intermediate frequency amplifiers, a chroma circuit, a video amplifier and a tuning circuit, to the high voltage generating circuit 204, and also to the feedback circuit 205 respectively. The output of circuits 204 and 205 is applied to the anode of CRT. A part of the D.C. output on the line 52 is applied through a line 54 to an input of a comparator 56. The comparator 56 has another input connected through a line 58 to a reference voltage circuit which produces a reference voltage signal. The comparator 56 has still another input connected through a line 60 to a beam current detector 62 which produces a beam current signal representing intensity of the beam current of the cathode ray tube. The comparator 56 produces the control signal on the line 64 by comparing the signals applied to its three inputs.

As shown in FIG. 2, in the circuit according to the present invention the controlled power supply to anode of CRT, and that to the deflecting circuits and load circuit after the voltage regulator 50 are separated, so that the high constant stabilized voltage which is applied to the anode of CRT through the two circuits 204 and 205 is more secured without being affected by a change in amplitude in the deflection circuits at the time of adjustment of the circuits.

The reason is that since condition of a picture on the CRT is affected greatly by both a change in the horizontal and vertical circuits and a change in the high voltage applied to CRT, the separation of the input power produces a good result, especially in television receivers having a wide angle CRT.

In addition, when, for instance, a power to the horizontal deflection increases, stray capacities on transistors in the high voltage circuit tends to increase, so that separation of the circuits is desirable in order to get a good stability of CRT.

Being thus constructed, the voltage of the D.C. output of the converter is satisfactorily regulated in accordance with not only the variation of the output voltage but also the intensity of the beam current of the cathode ray tube.

Figure 3:
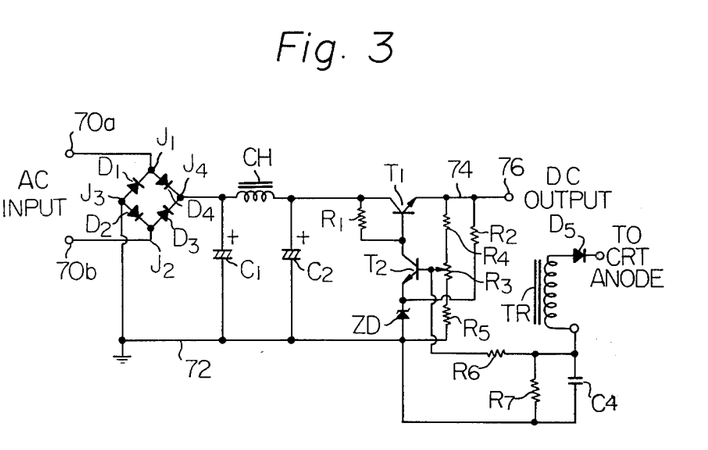
FIGS. 3 to 6 are diagrams showing embodiments of the converter of FIG. 2.

FIG. 3 illustrates a preferred circuit arrangement for the converter of FIG. 2 but the circuits such as 201, 202, 203, 204, and 205 as shown in FIG. 2 are not shown here for simplicity, which comprises a full-wave rectifier constituted by four diode connected with one another in bridge form. Joints $J_1$ and $J_2$ between the diodes $D_1$ and $D_4$ and the diodes $D_2$ and $D_3$ are respectively connected to input terminals 70a and 70b through which an A.C. power is supplied. A joint $J_3$ between the diodes $D_1$ and $D_2$ is connected to an earth bus line 72 which is grounded. A joint $J_4$ between the diodes $D_2$ and $D_4$ is connected to choke coil CH and to a positive terminal of an electrolytic capacitor $C_1$. A positive terminal of the capacitor $C_1$ is connected to the earth bus line 72. The other terminal of the choke coil CH is connected to a collector of a transistor $T_1$ of NPN type and also to a positive terminal of an electrolytic capacitor $C_2$. A negative terminal of the capacitor $C_2$ is connected to the earth bus line 72. The collector of the transistor $T_1$ is connected through a bias resistor $R_1$ to base of the transistor $T_1$ so as to permit a bias current to flow from the base to an emitter of the transistor $T_1$. The emitter of the transmitter $T_1$ is connected through a line 74 to an output terminal 76. The base of the transistor $T_1$ is connected to a collector of a transistor $T_2$. An emitter of the transistor $T_2$ is connected to a cathode of a zener diode ZD an anode of which is connected to the earth bus line 76. The cathode of the zener diode ZD is connected through a bias resistor $R_2$ to the line 74 so as to permit a bias current to flow through the zener diode ZD. A base of the transistor $T_2$ is connected to a slidable tap of an adjustable resistor $R_3$ which is connected through a resistor $R_4$ to the line 74 and through a resistor $R_5$ to the earth bus line 72. The resistor $R_3$, $R_4$ and $R_5$ from a voltage divider so that a potential at the tap of the resistor $R_3$ is varied according to the variation of the potential on the line 74. The base of the transistor $T_2$ is also connected through a resistor $R_6$ to a lower voltage side terminal of a fly-back transformer TR. the higher voltage side terminal of the secondary coil is connected through a diode $D_5$ to an anode of a cathode ray tube (not shown). The lower-voltage terminal of the secondary coil is connected through a parallel connection of a resistor $R_7$ and a capacitor $C_4$ to the earth bus line 72.

When, in operation, an A.C. power is supplied to the terminals 70a and 70b, a full-wave rectified signal appears at the joint $J_4$. The rectified signal is then smoothed by the smoothing filter constituted by the choke coil CH and the capacitors $C_1$ and $C_2$. The thus smoothed power is applied to the collector of the transistor $T_1$. The smoothed power is also applied through the resistor $R_1$ to the base of the transistor $T_2$ thereby to flow a bias current from the base to the emitter of the transistor $T_1$. A D.C. voltage then appears at the emitter of the transistor $T_1$, which voltage depends on the potential of the base of the transistor $T_1$. The D.C. voltage at the emitter is then applied through the terminal 76 to a circuit connected to the cathode ray tube. The D.C. voltage on the line 74 is, on the other hand, divided into a voltage at the slidable tap of the adjustable resistor $R_3$ which is applied to the base of transistor $T_2$ and cause a bias current to flow from the base through the emitter to the zener diode ZD. The D.C. voltage on the line 74 is applied through the resistor $R_2$ to the zener diode ZD with the result that a bias current flows therethrough. The potential at the emitter of the transistor $T_1$ is, therefore, kept substantially constant due to the property of the zener diode ZD, whereby the potential of the base of the transistor $T_1$ varies depending on the variation of the D.C. output voltage on the line 74.

Since the high voltage terminal of the secondary coil of the fly-back transformer TR is connected to the anode of the cathode ray tube, a current proportionate to the beam current of the cathode ray tube flows through the parallel connection of the resistor $R_7$ and capacitor $C_4$ and the secondary coil, whereby the potential at the lower voltage terminal of the secondary coil varies depending on the intensity of the anode current representing the intensity of the beam current of the cathode ray tube. The potential variation at the lower voltage terminal is delivered through the resistor $R_6$ to the base of the transistor $T_2$, so that, the potential of the base of the transistor varies according to the voltage on the line 74 and the beam current of the cathode ray tube. Consequently, the D.C. output voltage is regulated in accordance with not only its own intensity but also the intensity of the beam current of the cathode ray tube.

In this instance, it is to be understood that the converter shown in FIG. 2 is operable even if the feedback line 54 is neglected and the comparator 56 produces the control signal without reference to the output voltage.

Figure 4:
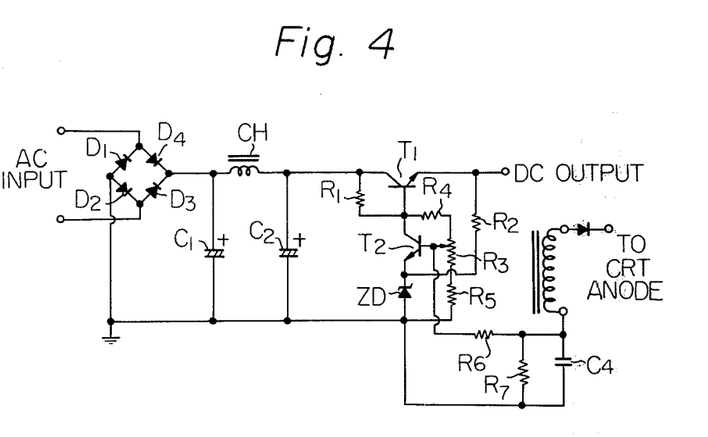

FIG. 4 illustrates a circuit arrangement of such converter which regulates the D.C. output voltage with reference to the reference voltage signal and the beam current signal. However, the circuits such as 201, 202, 203, 204, and 205 as shown in FIG. 2 are not indicated here for simplicity. The circuit arrangement has the same elements as those of the circuit of FIG. 3, which are similarly designated and constructed in the same manner as the circuit of FIG. 3 except that the resistor $R_4$ is connected to the base of the transistor $T_1$.

The operation of the circuit of FIG. 4 is the same as that of FIG. 3 except that the D.C. output voltage is regulated with reference only to the beam current signal through the resistor $R_6$.

Figure 5:
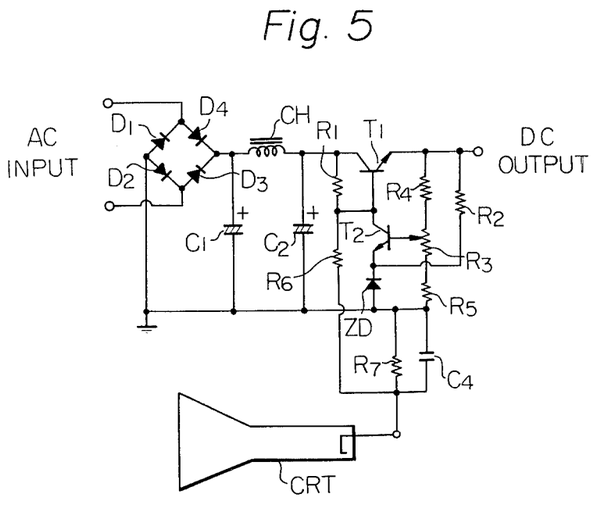

FIG. 5 shows still another circuit arrangement for the converter of FIG. 2. However, the circuits such as 201, 202, 203, 204, and 205 as shown in FIG. 2 are not shown here for simplicity. This circuit comprises the same elements as those of the circuit of FIG. 3, which are therefore similarly designated and connected to one another in the same manner except that the resistor $R_6$ is connected to the base of the transistor $T_1$ and one terminal of the parallel connection of the resistor $R_7$ and the capacitor $C_4$. The one terminal of the parallel connection is, in this case, connected to a cathode of a cathode ray tube CRT.

Since the beam current of the cathode ray tube is proportional to the potential at the one terminal of the parallel connection, the base potential of the transistor $T_1$ is varied in accordance with the beam current.

Figure 6:
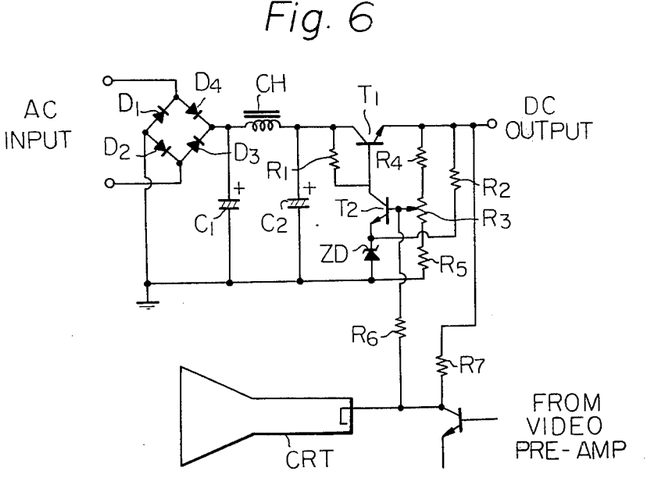

FIG. 6 illustrates still another circuit arrangement for the converter of FIG. 2, but, the circuits such as 201, 202, 203, 204, and 205 as shown in FIG. 2 are not shown here for simplicity, wherein the D.C. output voltage is supplied through the resistor $R_7$ to a collector of a transistor connected to the cathode of the cathode ray tube. The resistor $R_6$ is interposed between the base of the transistor $T_2$ and the cathode of the cathode ray tube. It is apparent that the operation of this circuit is identical to that of FIG. 5 and therefore explanation for this circuit is to be omitted.

Figure 7:
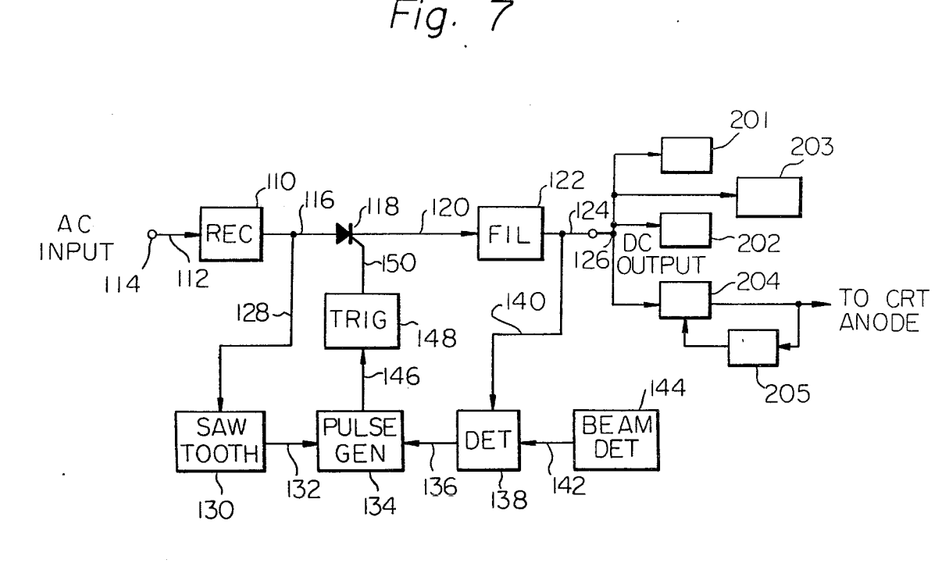
FIG. 7 is a block diagram of another converter according to this invention.

In FIG. 7, another form of converter according to this invention is shown comprising a rectifier 110 for rectifying an A.C. power applied through a line 112 and an A.C. input terminal 114. An output of the rectifier 110 is connected through a line 116 to an anode of a thyristor 118 for passing therethrough the rectified A.C. power in accordance with a trigger signal to be applied through a gate thereof. A cathode of the rectifier 118 is connected through a line 120 to an input of a smoothing filter 122 for smoothing the power from the thyrister. An output of the filter is connected through a line 124 to a D.C. output terminal 126 through which the rectified and smoothed power is supplied to a cathode ray tube (not shown). The output of the rectifier 110 is also connected through a line 128 to a saw-tooth wave generator 130 for producing a saw-tooth wave signal on its output having the same time period as and synchronized with that of rectified power through the line 128. The output of the saw-tooth wave generator 130 is connected through a line 132 to an input of a pulse generator 134 which is adapted to generate a pulse when the level of the saw-tooth wave signal reaches a predetermined value which is adjusted in accordance with a level signal through a line 136 produced by a detector 138. The detector 138 produces the level signal in reference with the output voltage through a line 140 of the filter 122 and a beam-current signal delivered through a line 142 from a beam-current detector 144 for detecting intensity of the beam-current of the cathode ray tube. The pulse from the pulse generator 134 is applied through a line 146 to a trigger circuit 148 which converts the pulse into a trigger pulse. The trigger pulse from the trigger circuit is applied through a line 150 to the gate of the thyrister 118.

The circuit elements such as the horizontal and vertical deflection circuits 201 and 202, the load circuits 203 including video intermediate frequency amplifiers, a chroma circuit, a video amplifier circuit, and a tuning circuit, and a stabilizing circuit consisting of the high voltage generating circuit 204 and the feedback circuit 205 are shown in the figure, which have the particular functions as described with respect to the function shown in FIG. 2.

When, in operation, an A.C. power is supplied to the input terminal 114, the A.C. power is rectified by the rectifier 110 and then applied through the line 116 to the anode of the thyrister 118. The thyrister 118 passes therethrough the rectified power while controlled by the trigger pulse. The power passed through the thyrister 118 is then applied through the line 120 to the smoothing filter 122 which smoothes the power by removing ripple components.

The pulse generator 134, on the other hand, produces pulses in accordance with signals from the saw-tooth wave generator and the detector 138. The pulses are converted into trigger pulses which are applied to the gate of the thyrister 118 to trigger the thyrister 118 whereby the D.C. output voltage on the terminal 126 is kept constant.

Figure 8:
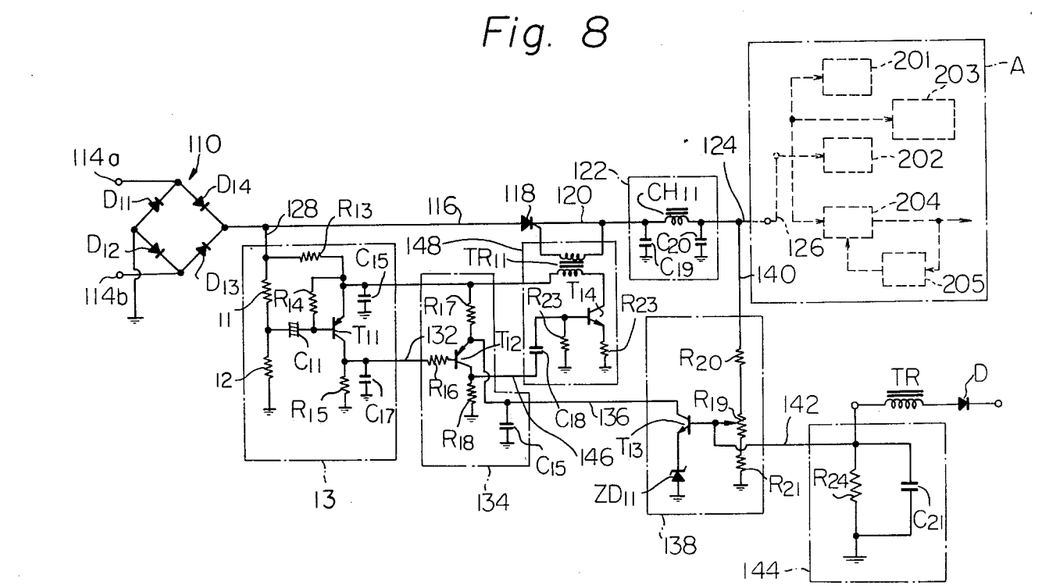
FIGS. 8 and 9 are diagrams showing embodiments of the converter of FIG. 7.

FIG. 8 shows a preferred circuit arrangement for the converter of FIG. 7, wherein the rectifier 110 is constituted by four diodes $D_{11}$, $D_{12}$, $D_{13}$ and $D_{14}$ connected to one another in bridge form. The smoothing filter 122 is constituted by a choke coil $CH_{11}$ having one terminal connected to the line 120 and through a capacitor $C_{19}$ to the ground, and the other terminal connected to the line 124 and through a capacitor $C_{20}$ to the ground.

The saw-tooth wave generator 130 comprises a resistor $R_{11}$ having one terminal connected to the line 128. The other terminal of the resistor $R_{11}$ is connected to one terminal of a resistor $R_{12}$. The other terminal of the resistor $R_{12}$ is grounded. The other terminal of the resistor $R_{11}$ is also connected through a coupling capacitor $C_{11}$ to a base of a transistor $T_{11}$. The transistor $T_{11}$ has an emitter connected through a resistor $R_{13}$ to the line 128 and a collector grounded through a parallel connection of a resistor $R_{15}$ and capacitor $C_{17}$. The emitter and the base of the transistor $T_1$ is connected to each other through a resistor $R_{14}$. In order to remove ripple components, the emitter of the transistor $T_{11}$ is grounded through a capacitor $C_{13}$.

The pulse generator 134 comprises a transistor $T_{12}$ of PNP type having an emitter connected through a resistor $R_{17}$ to the emitter of the transistor $T_{11}$. The transistor $T_{12}$ has a base connected through a resistor $R_{16}$ to the line 132 and a collector grounded through a resistor $R_{18}$. The emitter of the transistor $T_{12}$ is connected to the line 136 and a capacitor $C_{15}$ which is in turn grounded.

The detector 138 comprises a transistor $T_{13}$ of NPN type having a collector connected to the line 136, an emitter grounded through a zener diode $ZD_{11}$, and a base connected to a slidable tap of an adjustable resistor $R_{19}$ and the line 142. The adjustable resistor $R_{19}$ is connected through a resistor $R_{20}$ to the line 140 and through a resistor $R_{21}$ to the ground.

The beam current detector 144 comprises a parallel connection of a resistor $R_{24}$ and a capacitor $C_{21}$, which connection has one terminal connected to the line 142 and to a lower-voltage terminal of a fly-back transformer, and the other terminal grounded. The fly-back transformer has a higher-voltage terminal connected through a diode to an anode of the cathode ray tube.

The trigger circuit 148 comprises a transistor $T_{14}$ of NPN type having a base connected through a capacitor $C_{18}$ to the line 146 and through a resistor $R_{23}$ to the ground. The transistor $T_{14}$ has an emitter grounded through a resistor $R_{22}$, and a collector connected to one terminal of a primary coil of a transformer $TR_{11}$. The other terminal of the primary coil is connected through the resistor $R_{13}$ to the line 128. A secondary coil of the transformer $TR_{11}$ has one terminal connected to the gate of the thyrister 118, and the other terminal connected to the line 120.

Also in FIG. 8, there is shown the circuit A which has the elements such as the horizontal and vertical deflection circuits 201 and 202, the load circuits 203 including video intermediate frequency amplifiers, a chroma circuit, a video amplifier circuit, and a tuning circuit, and a stabilizing circuit consisting of the high voltage generating circuit 204 and the feedback circuit 205 are shown, which have the specific functions as described in the circuit in FIG. 2.

Figure 9:
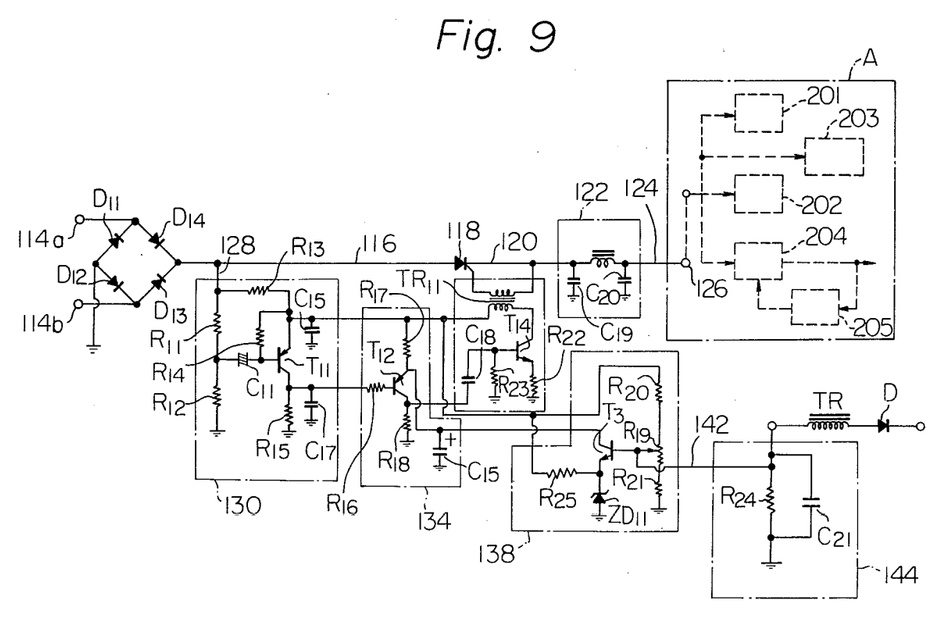

In FIG. 9, another circuit arrangement of the converter of FIG. 7 is shown, wherein the feedback line 140 is neglected. The circuit comprises the same elements as the circuit of FIG. 8, which are therefore designated identically thereto. However, the resistor $R_{20}$ is connected to the line 128 through the resistor $R_{13}$ of the saw-tooth wave generator 130 and the cathode of the zener diode $ZD_{11}$ is connected through a resistor $R_{25}$ to the line 128 so that the diode $ZD_{11}$ is biased.

It will be understood that the invention is not to be limited to the exact construction shown and described and that various changes and modifications may be made without departing from the spirit and scope of the invention, as defined in the appended claims.

What is claimed is:

1. A power supply system for supplying a high voltage to an anode of a display tube and a relatively low voltage to deflection circuits of the display tube, which comprises:
    rectifying means for rectifying an a.c. input into pulsating d.c.;
    beam current detecting means for producing a beam current signal representative of intensity of the beam current of said display tube;
    low voltage supplying means coupled to said rectifying means and responsive to the beam current signal of said detecting means for converting pulsating d.c. into a relatively low voltage and for supplying the low voltage to said deflection circuits of said display tube, while regulating the level of said low voltage in accordance with said beam current signal;
    high voltage supplying means coupled to said low voltage supplying means for converting the relatively low voltage into a constant high voltage and for supplying the high voltage to said anode of said display tube; and
    feedback means coupled to said high voltage supplying means for stabilizing the high voltage of said high voltage supplying means.

2. A power supply system according to claim 1, including a flyback transformer having a secondary coil, and wherein said beam current detecting means includes:
    means for detecting the potential at a lower voltage terminal of said secondary coil of said flyback transformer which supplies a d.c. acceleration voltage to an anode of said display tube.

3. A power supply system according to claim 1, wherein said beam current detecting means includes:
    means for detecting cathode current of said display tube.

4. A power supply system according to claim 1, wherein said beam current detecting means includes:
    means for detecting potential at a cathode of said display tube.

5. A power supply system according to claim 1, wherein said low voltage supplying means includes:
    a smoothing filter for smoothing said pulsating d.c.;
    a reference voltage generator for producing a reference voltage signal;
    a comparator responsive to the reference voltage signal and the beam current signal for producing a control signal in accordance with the reference voltage signal and the beam current signal; and
    a voltage regulator controllably connected to said comparator for producing the relatively low voltage while regulating level of this voltage in response to the control signal.

6. A power supply system according to claim 1, wherein said low voltage supplying means includes:
    a smoothing filter for smoothing said pulsating d.c.;
    a reference voltage generator for producing a reference voltage signal;
    a comparator responsive to the reference voltage signal, the beam current signal and the level of the relatively low voltage for producing a control signal in accordance with these parameters; and
    a voltage regulator controllably connected to said comparator for producing the relatively low voltage while regulating the relatively low voltage in response to the control signal.

7. A power supply system according to claim 1, wherein said low voltage supplying means includes:
    a saw-tooth wave signal generator for converting the pulsating d.c. into a saw-tooth wave signal synchronized with the pulsating d.c. from said rectifying means;
    a detector responsive to the beam current signal for producing a level signal in accordance with the beam current signal;
    a pulse generator responsive to the level signal for producing a pulse when the saw-tooth wave signal reaches a given value as determined by the level signal;
    a trigger circuit coupled to said pulse generator for converting the pulse into a trigger pulse;
    a thyristor controllably coupled to said trigger circuit and responsive to its output for passing the pulsating d.c. upon receiving through its gate the trigger pulse; and
    a smoothing filter coupled to said thyristor for smoothing thus passed d.c. so as to produce the relatively low voltage.

8. A power supply system according to claim 1, wherein said low voltage supplying means includes:
    a saw-tooth wave signal generator for converting the pulsating d.c. from said rectifying means into a saw-tooth wave signal synchronized with the pulsating d.c. from said rectifying means;
    a detector responsive to the relatively low voltage for producing a level signal in accordance with level of the relatively low voltage;
    a pulse generator responsive to the level signal for producing a pulse when the saw-tooth wave signal reaches a given value as determined by the level signal;
    a trigger circuit coupled to the pulse generator for converting the pulse into a trigger pulse;
    a thyristor controllably coupled to said trigger circuit and responsive to its output for passing the pulsating d.c. upon receiving through its gate the trigger pulse; and
    a smoothing filter coupled to said thyristor for smoothing the thus passed d.c. so as to produce the relatively low voltage.

* * * * *